No. 739,116. Patented September 15, 1903.

UNITED STATES PATENT OFFICE.

CHARLES T. SNEDEKOR, OF CHICAGO, ILLINOIS.

PROCESS OF DISINTEGRATING ORES.

SPECIFICATION forming part of Letters Patent No. 739,116, dated September 15, 1903.

Application filed October 15, 1902. Serial No. 127,410. (No specimens.)

*To all whom it may concern:*

Be it known that I, CHARLES T. SNEDEKOR, of Chicago, in the county of Cook and State of Illinois, have invented certain new and useful Improvements in Processes of Disintegrating Ores; and I hereby declare that the following is a full, clear, and exact description thereof, reference being had to the accompanying drawings, which form part of this specification.

My invention relates to improvements in processes for disintegrating ores.

The object of my invention is to provide a process and mode of procedure whereby ores containing metal or other material to be reclaimed may be disintegrated or reduced to a fine granular or powdered state, thereby exposing such material in a condition available for any subsequent process of separation.

Heretofore refractory ores—such as quartz, granite, flint, &c.—containing precious metals or other substances to be extracted have been reduced by being subjected to crushing effects, consisting of the application of mechanical impact, attrition, or similar means, prior to the subsequent processes usually pursued for separating the associated material from the matter to be reclaimed. This mode of procedure is crude, expensive, and slow in operation, requiring considerable power, which is not always conveniently available, and a large outlay of money for the installation and operation of extensive stamping-mills and accompanying machinery.

My process for reducing ores to a finely-divided state consists in subjecting them to the effect of an alkali bath or solution for a suitable period of time, then removing the ores from the bath and heating them until they become practically red-hot, and while so heated they are returned to the liquid in which they were formerly contained and subsequently submerged therein. The effect upon the ores is to immediately disintegrate them until they become a pulverulent mass, when any metal mechanically inclosed in said ores will be released, and any metal or other substance held in chemical combination will be easily separated by chemical or other subsequently-applied processes, owing to the excessively-large surfaces made available by the triturated condition of the ores.

I have found that the practice of my process will satisfactorily disintegrate the ores when the solution in which they are immersed consists in substantially the proportion of one gallon of water having two ounces of concentrated lye dissolved therein. Other alkaline solutions, however, may be used, and I do not wish to be limited to the exact proportions of the solution described.

Having described my invention, what I claim as new and useful, and desire to secure by Letters Patent of the United States, is—

A process for disintegrating ores, which consists in first submerging the ore, while at normal temperature, in a solution containing an alkali, then heating said ore to a high degree of temperature, and then returning it while hot to said solution.

In testimony that I claim the foregoing as my own I affix my signature in presence of two witnesses.

CHARLES T. SNEDEKOR.

In presence of—
   EVA M. LEES,
   WM. F. NEVERMANN.